(12) United States Patent
Yang et al.

(10) Patent No.: US 6,369,721 B1
(45) Date of Patent: Apr. 9, 2002

(54) INPUT DEVICE WITH PAGE TURNING FUNCTION

(75) Inventors: Kuo-Ping Yang, 4th Fl., No. 18-1, Section 3, Ren Ai Rd.; Shu-Hua Guo, both of Taipei (TW)

(73) Assignee: Kuo-Ping Yang, Taipei (TW)

( * ) Notice: Subject to any disclaimer, the term of this patent is extended or adjusted under 35 U.S.C. 154(b) by 0 days.

(21) Appl. No.: 09/440,636

(22) Filed: Nov. 16, 1999

(30) Foreign Application Priority Data

Aug. 25, 1999 (TW) ........................................ 88214503 U

(51) Int. Cl.[7] .............................................. H03K 17/94
(52) U.S. Cl. ............................ 341/21; 341/23; 345/173
(58) Field of Search ............................... 341/22, 23, 26; 345/173

(56) References Cited

U.S. PATENT DOCUMENTS

| | | | | |
|---|---|---|---|---|
| 5,088,928 A | * | 2/1992 | Chan | 434/339 |
| 5,450,078 A | * | 9/1995 | Silva et al. | 341/22 |
| 5,663,748 A | * | 9/1997 | Huffman et al. | 345/173 |
| 5,691,748 A | * | 11/1997 | Fukuzaki | 345/173 |

* cited by examiner

*Primary Examiner*—Timothy Edwards
(74) *Attorney, Agent, or Firm*—Bacon & Thomas

(57) ABSTRACT

An input device with page turning used with a set of communication cards, and driven to record input voice, to reproduce recorded voice signal or send recorded voice signal to an external computer through a transmission line when the user presses on one of the communication cards, the input device including a casing having an operating surface area, which holds the communication cards, a clip provided at the casing to hold the communication cards for enabling the communication cards to be taken out and replaced.

5 Claims, 8 Drawing Sheets

INPUT DEVICE WITH PAGE TURNING FUNCTION

BACKGROUND OF THE INVENTION

The present invention relates to input devices, and more specifically to such an input device, which has page-turning function.

Various communication boards have been developed for young children, and people who suffer from a speaking problem, cerebral paralysis, stroke, intellectual incapability, etc. Similar apparatus are seen in U.S. Pat. No. 5,450,078; Taiwan Patent Publication No. 341340 entitled "Voice Communication Board"; Taiwan Patent Application Serial No. 88200416 (U.S. patent application Ser. No. 09/314,633) entitled "Input Device".

In the aforesaid input device, a communication card is selected from a set of communication cards, and then put in an operating surface area. The operating surface area has positioning grooves for the positioning of the selected communication card. Because several tens or even one hundred of communication cards may be used, the user may spend a lot of time in changing the communication cards.

SUMMARY OF THE INVENTION

It is the main object of the present invention to provide an input device with page turning function, which keeps a set of communication cards in such a manner that the communication cards can be taken out and replaced, and the desired communication card can be quickly selected by means of page turning. It is another object of the present invention to provide an input device which uses a loose-leaf clip to hold a set of communication cards in good order, for enabling the user to select the desired communication card quickly, and to press the selected communication card for voice input/output, or electronic signal output to an external computer. To achieve these and other objects of the present invention, there is provided an input device, which is used with a set of communication cards, and driven to output voice or send a signal to a computer through a transmission line to control a software program in the computer when the user presses on communication card, the input device comprising a casing having an operating surface area, a clip provided at the casing to hold the communication cards at the operating surface area, enabling the communication cards to be taken out and replaced, and a circuit assembly for controlling voice recording and reproduction operation and outputting of recorded voice signal to the computer. The circuit assembly comprises a communication card recognition device. According to one embodiment of the present invention, clicking a corresponding card number button produces the card number of the communication card. According to another embodiment of the present invention, each communication card is provided with a respective code, and a code reader is provided to read the code at the selected communication card. The clip of the present invention is commonly used in, for example, notebooks. However, no any existing input device uses similar clip to hold communication cards.

DETAILED DESCRIPOTION OF THE PREFERRED EMBODIMENT

Figure 1:
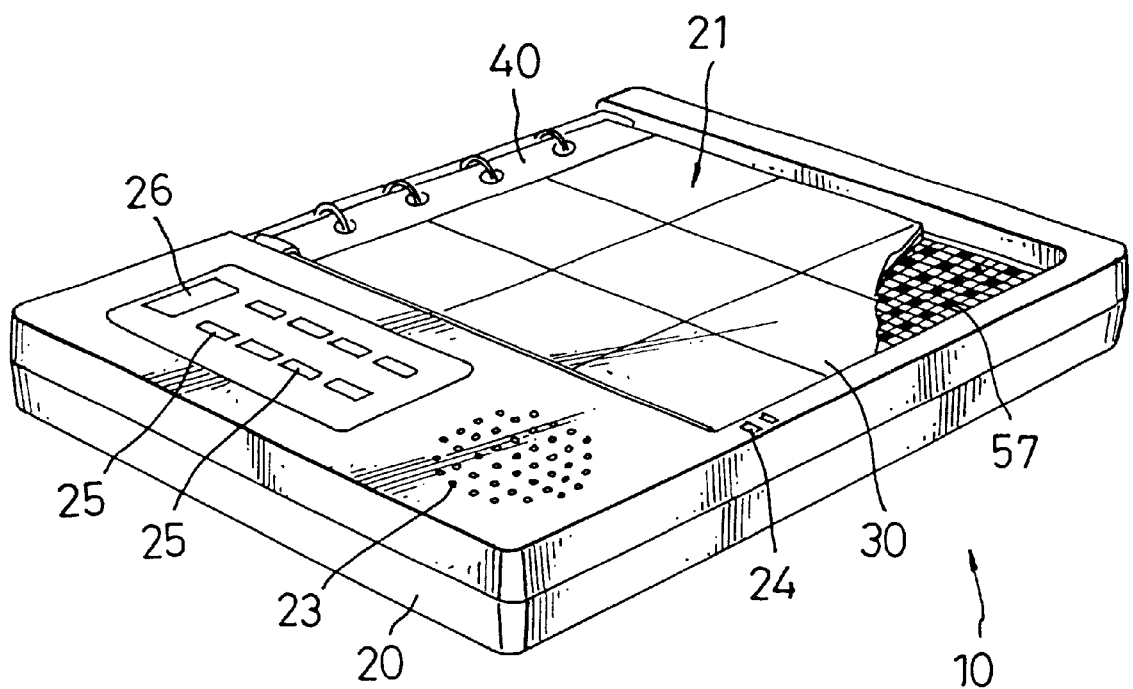
FIG. 1 is a perspective view of an input device according to a first embodiment of the present invention.
Figure 2:
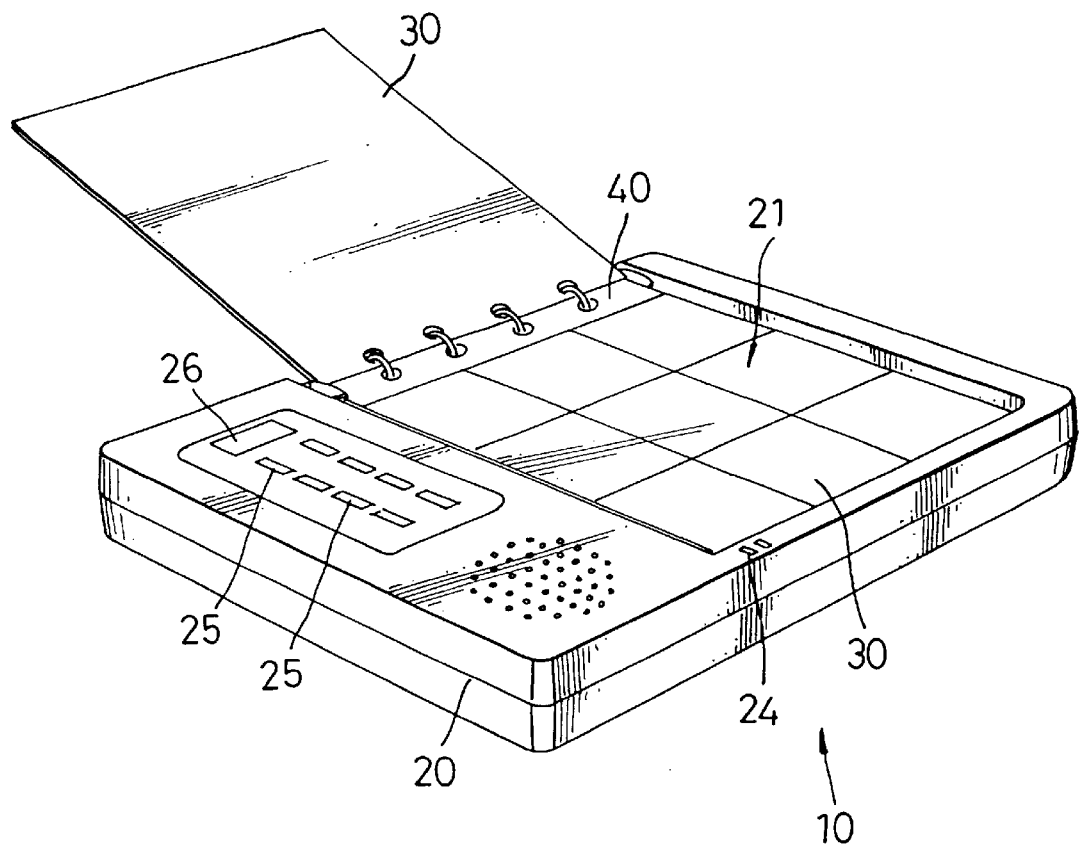
FIG. 2 is an applied view of the first embodiment of the present invention, showing one communication card turned out of the operating surface area.
Figure 3:
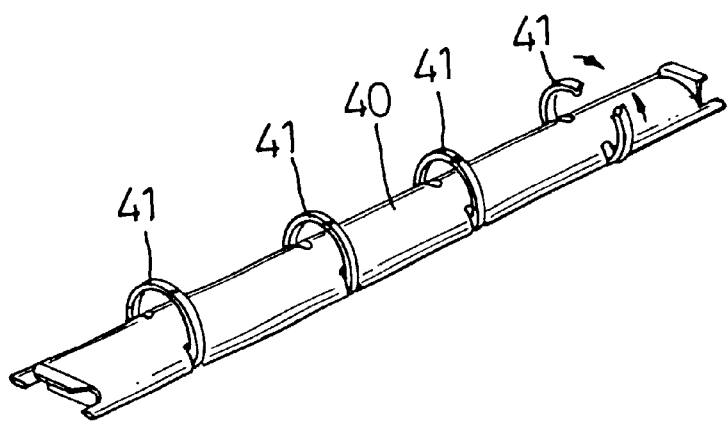
FIG. 3 is a perspective view of the clip used in the input device of the first embodiment of the present invention.
Figure 4:
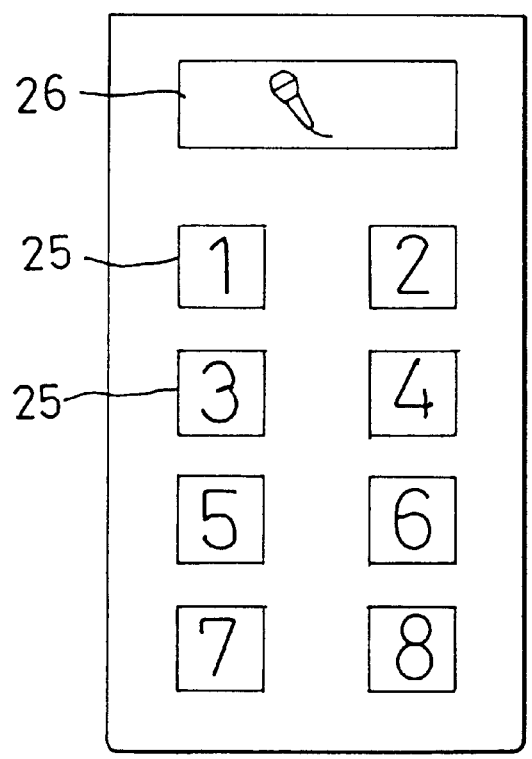
FIG. 4 is a plain view of the operation keys used in the input device of the first embodiment of the present invention.
Figure 7:
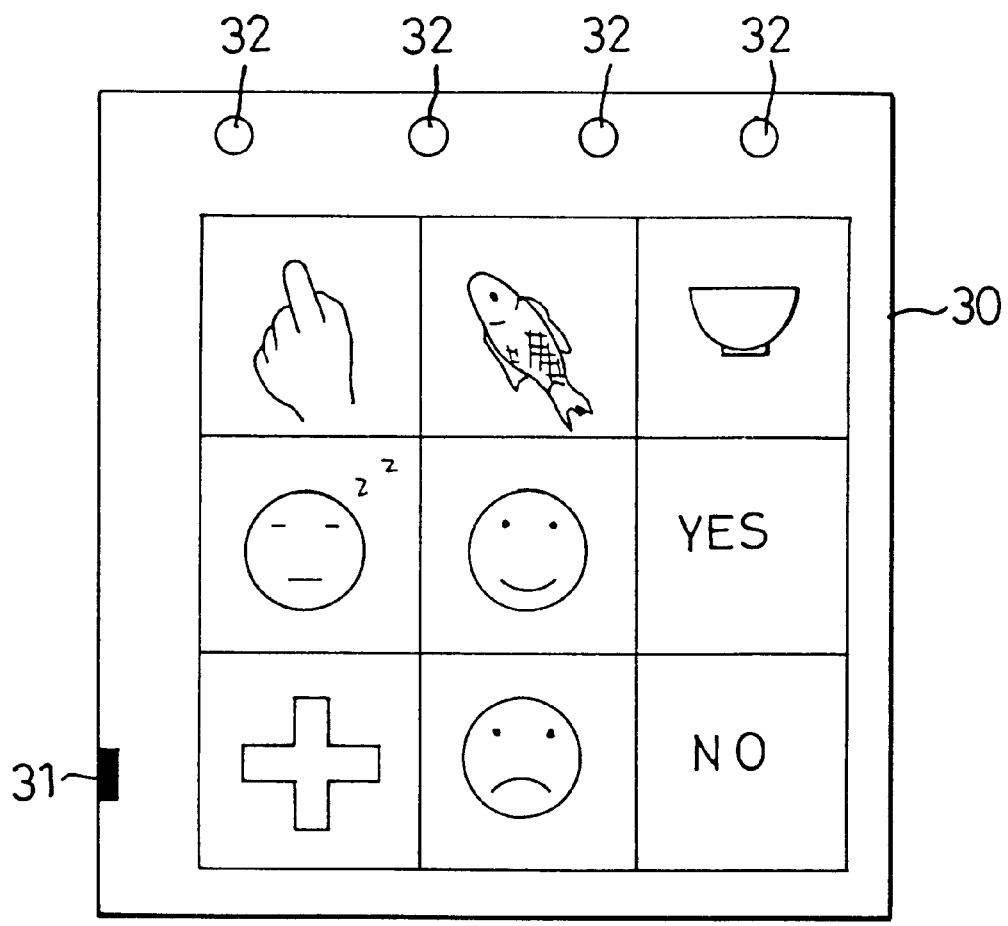
FIG. 7 is a plain view showing one embodiment of a communication card according to the present invention.

Referring to FIGS. from 1 through 5, an input device 10 is shown comprising a casing 20 having an operating surface area 21, a set of communication cards 30 put on the operating surface area 21, a speaker 23 disposed in the casing 20 for voice output, and a microphone 24 mounted in the casing 20 for voice input. The communication cards 30 are marked with different instructions, letters, icons, etc (see FIG. 7). When the user presses on a particular instruction, letter or icon at one communication card 30, a corresponding area of touch pad 57 is triggered for voice input/output. For further details about this touch control switch-actuated voice input/output function, please refer to Taiwan Patent Publication No. 341340, entitled "Voice Communication Board". The main feature of the present invention is the arrangement of the communication cards 30 at the operating surface area 21. The present invention provides the operating surface area 21 with a clip 40 for holding the communication cards 30, enabling the communication cards 30 to be taken out and replaced (see FIG. 7). Because the communication cards 30 can be turned page by page, the user can quickly select the desired communication card 30, and press on the respective card number button 25 (one type of the communication card recognition device 60 shown in FIG. 4) to give a communication card identification signal to the input device 10. Of course, the communication cards 30 should be marked with a respective card number for identification.

Figure 5:
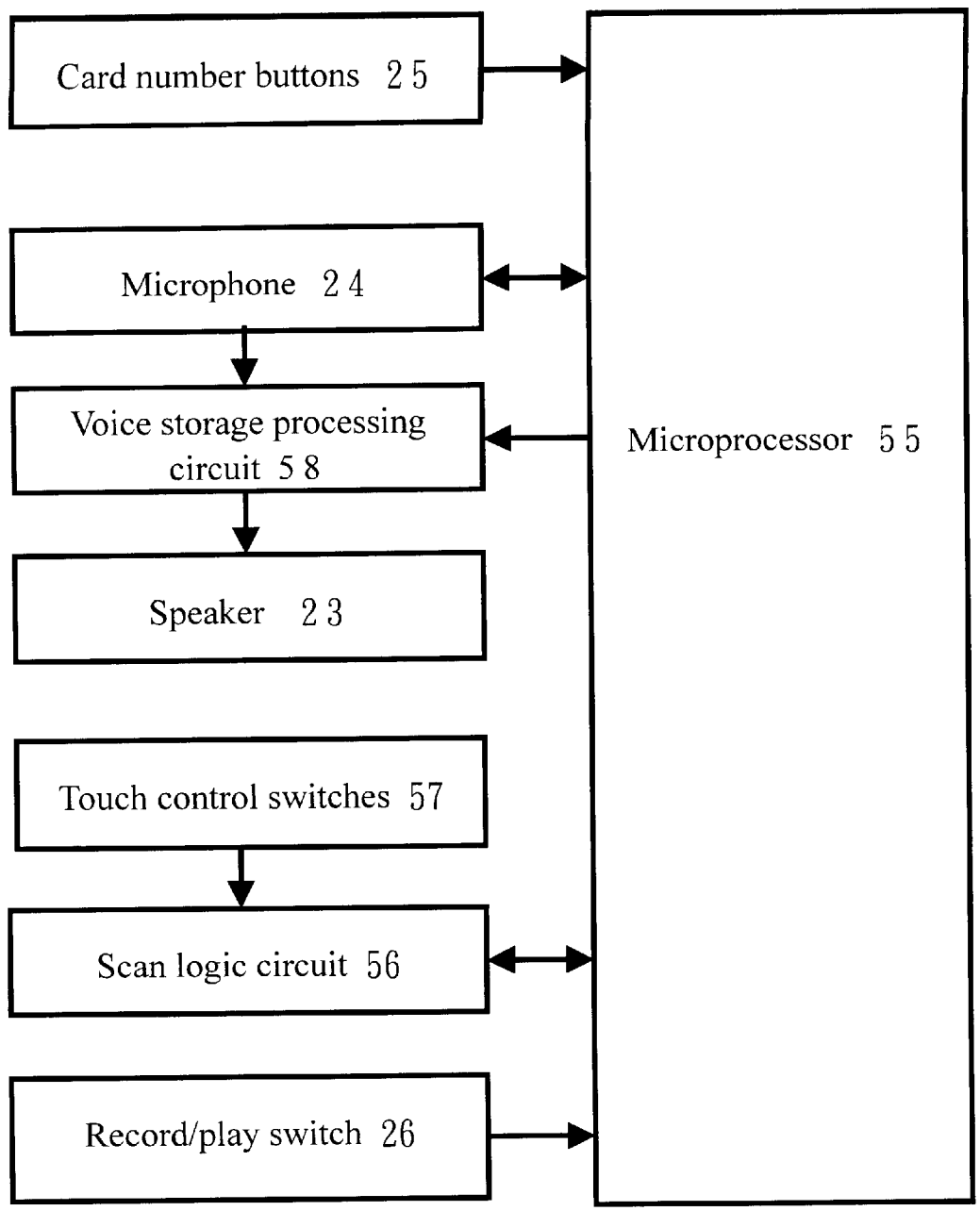
FIG. 5 is a circuit block diagram of the first embodiment of the present invention.
Figure 6:
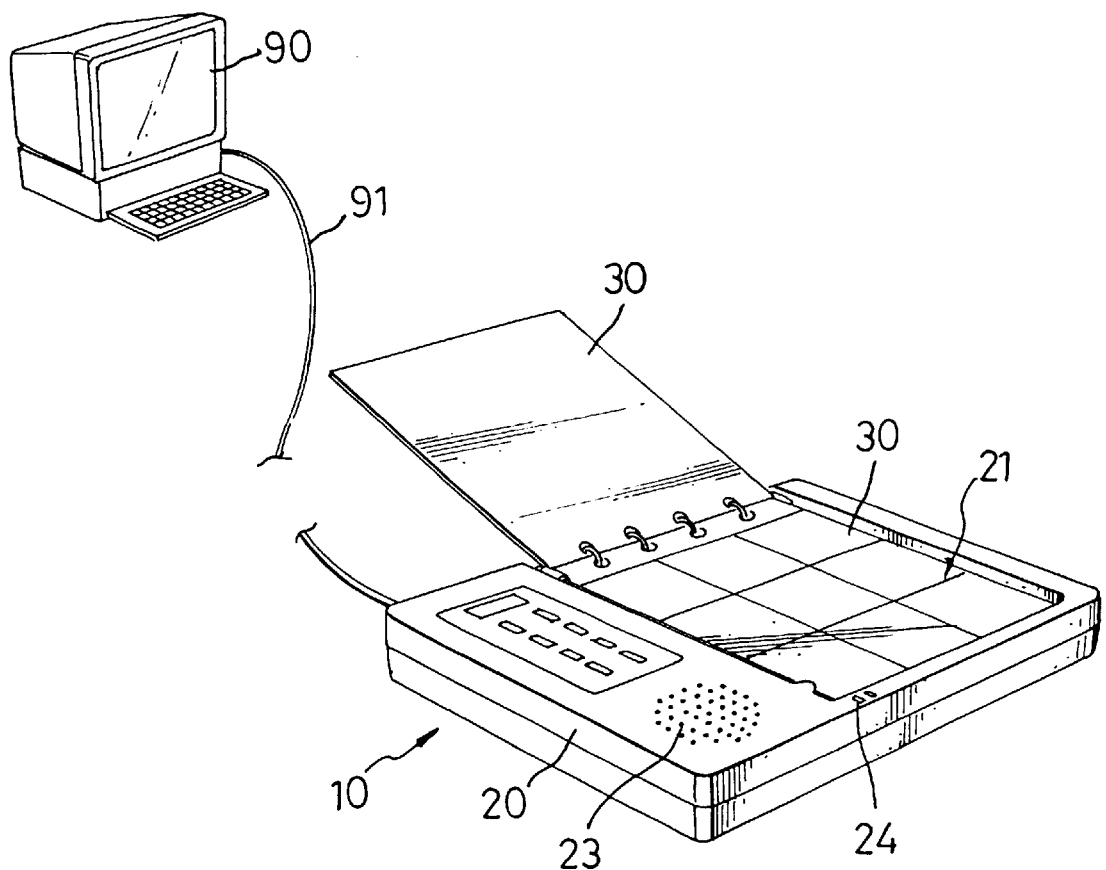
FIG. 6 is a perspective view of an input device according to a second embodiment of the present invention.

The circuit assembly 50 of the input device according to a first embodiment of the present invention is outlined hereinafter with reference to FIGS. from 1 through 5 again. As illustrated in FIG. 5, the circuit assembly 50 comprises, in addition to the aforesaid speaker 23, microphone 24 and card number buttons 25, a microprocessor 55, a record/play switch 26, a voice storage processing circuit 58, a scan logic circuit 56, and touch control switches 57. The microprocessor 55 is the control center of the circuit assembly 50, having program means burnt therein. The card number buttons 25 (communication card recognition device 60) are provided for enabling the user to input the card number of the selected communication card 30 into the microprocessor 55. The touch pad 57 is provided in the operating surface area 21. When the user touches one communication card 30, the touched area at the touch pad 57 is at "on" status, and the other non-touch area is at "off" status. The touch pad 57 can be an array of touch control switches manufactured by Taiwan Minplate Co., a hand writing board or drawing board, an induction board, or any suitable resistance type, capacitive type, magnetic type or thermo sensitive type touch control boards. The scan logic circuit 56 scans "on/off status" of every portion of the touch pad 57, and transfers the scanned information of variation to the microprocessor 55. The record/play switch 26 switches the input device 10 between the record status and the play status.

When the user presses on one particular part at one communication card 30 (for example, the fourth position at the third communication card 30) during the record status, a voice (for example, "How are you?") can be inputted into the voice storage processing circuit 58 through the microphone 24, and stored in the memory in the voice storage processing circuit 58. When the user presses on one particular part at one communication card 30 (for example, the fourth position at the third communication card 30) during the play status, the previously recorded voice (for example, "How are you?") is outputted from the voice storage processing circuit 58 through the speaker 23.

With respect to the function of the circuit assembly 50, please refer to Taiwan Patent Publication No. 341340, entitled "Voice Communication Board".

FIGS. from 6 through 9 show a second embodiment of the present invention. Same as the aforesaid first embodiment of the present invention, the second embodiment enables the user to change the communication card 30 by turning pages.

Figure 8:
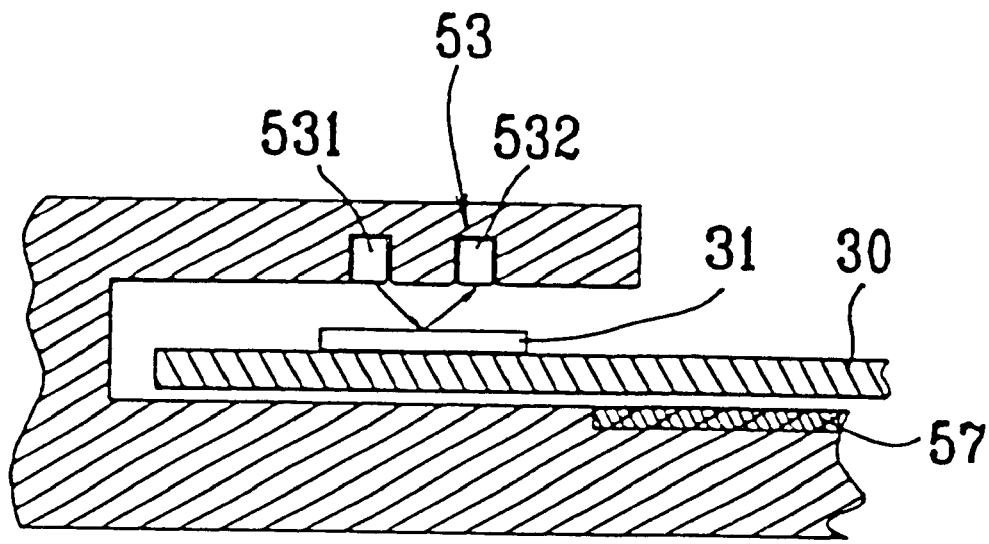
FIG. 8 is a sectional view of a part of the second embodiment of the present invention, showing the arrangement of the code reader.
Figure 9:
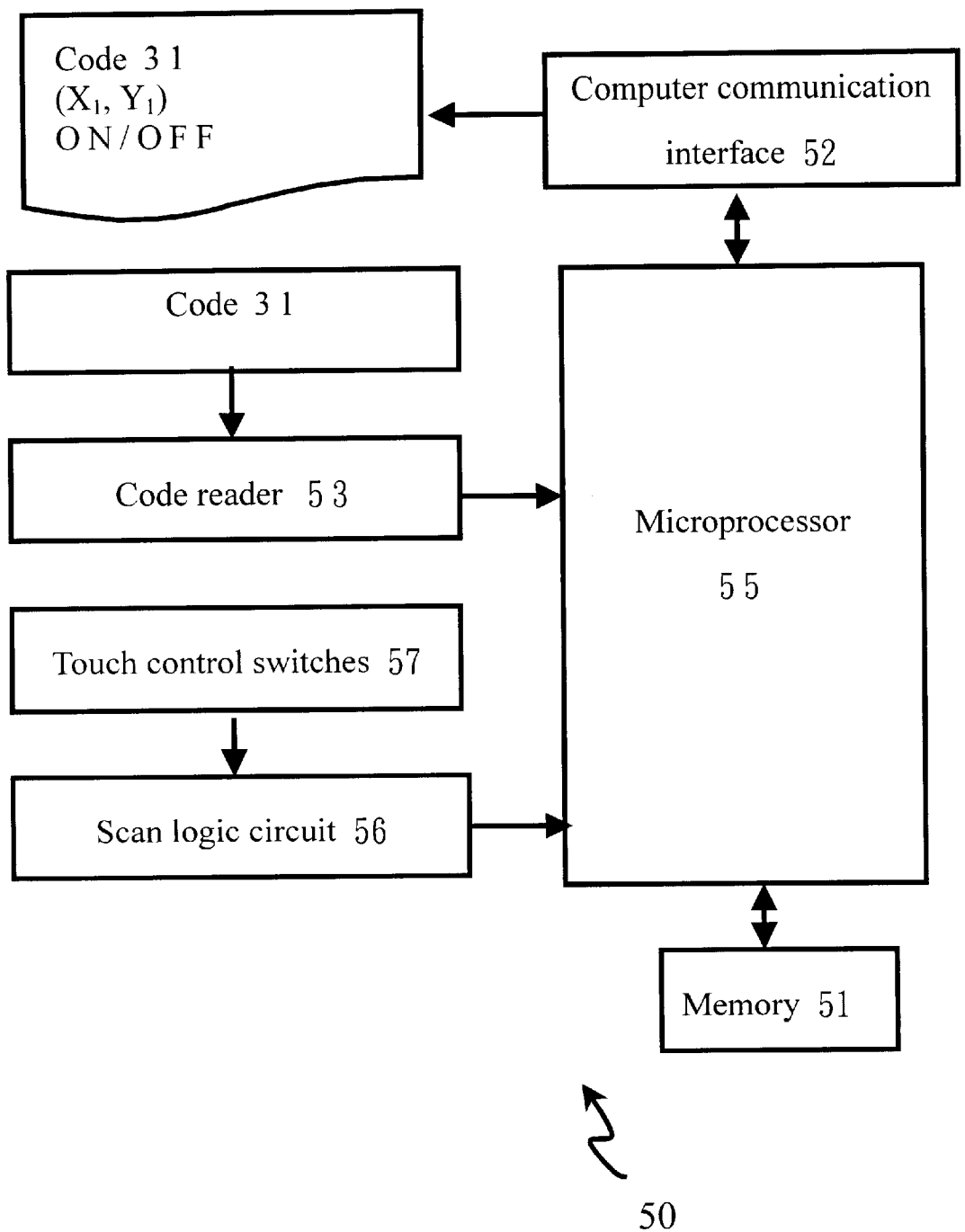
FIG. 9 is a circuit block diagram of the second embodiment of the present invention.

With respect to the techniques employed in the second embodiment of the present invention, please refer to Taiwan Patent Application Serial No. 88200416 (U.S. patent application Ser. No. 09/314,633). The circuit assembly 50 according to the second embodiment of the present invention comprises a memory 51, a computer communication interface 52, a code reader 53, a processor 55, a scan logic circuit 56, and a touch pad 57. The main difference of the second embodiment is that when the user presses on a particular instruction, letter or icon at one communication card 30, the input device 10 outputs a corresponding electronic signal to the computer 90 through the computer communication interface 52 via a transmission line 91, to control the running of a software program in the computer 90. The electronic signal includes the information of the card number of the operated communication card 30, the touched position (X1, Y1) at the array of touch control switches, and the on/off status of the touched position (X1, Y1). Another difference of the second embodiment is that the communication card recognition device 60 uses the code reader 53 to read in the code 31 of the operated communication card 30, and sends the reading result to the processor 55. The code reader 53 can be a color code reader 53 comprised of a transmitter 531 and a receiver 532 (see FIG. 8). In this case, the code 31 is a particular color printed on the communication card 30. Alternatively, the code reader 53 can be an infrared transmitter/receiver module. In this case, the code 31 is a bar code composed of dark stripes. The code readers 53 and the code 31 can be made in any of a variety of forms. Similar technique is indicated in U.S. Pat. No. 5,450,078.

In order to let the user change the processing flow of the internal program in the processor 55 or to fit different computer programs, it is suggested to store control parameters in the memory 51. The computer 90 through the computer interface 52 can change these control parameters. The memory 51 can be an EPROM (ERASABLE PROGRAMMABLE READ-ONLY MEMORY), Flash memory, EEPROM (ELECTRONICALLY ERASABLE PROGRAMMABLE READ-ONLY MEMORY), etc.

It is to be understood that the drawings are designed for purposes of illustration only, and are not intended as a definition of the limits and scope of the invention disclosed.

What the invention claimed is:

1. An input device used with a set of communication cards, and driven to output voice or send a signal to a computer through a transmission line to control a software program in the computer when the user presses on one of said communication cards, the input device comprising:

(1) a casing having an operating surface area on which said communication cards can be put, a clip provided at said casing to hold said communication cards for enabling said communication cards to be turned, (2) a circuit assembly, said circuit assembly comprising:
      (a) processor means, said processor means being the control center of said circuit assembly, comprising a program burnt therein for processing flow control;
      (b) communication card recognition means for inputting a respective card ID to said processor means;
      (c) a touchpad located on said operating surface area, when said communications card is placed on said operating surface, and pressed, an associated touched area of the touchpad changes to an "ON" status, and the untouched area remains in an "OFF" status; and
      (d) scan logic circuit means for scanning the "on-off state" on every part of said touchpad momentarily; and (3) a record/play switch for switching the input device between a record mode and a play mode, a microphone for voice input when said record/play switch is switched to said record mode and one part of one of said communication cards is depressed, a voice storage processing circuit for storing a voice signal input through said microphone, and a speaker for output of a respective voice signal from said voice storage processing circuit when said record/play switch is switched to said play mode and the respective part of the respective communication card is depressed.

2. The input device of claim 1 wherein said communication cards each comprise a row of through holes, and said clip comprises a plurality of clamping rings respectively fastened to the through holes at said communication cards to hold said communication cards together.

3. The input device of claim 1 further comprising a set of card number buttons corresponding to said communication cards for driving said communication card recognition means to inform said processor means of the communication card being operated by the user.

4. The input device of claim 1 wherein said circuit assembly further comprises a code reader for reading a code at each of said communication cards for enabling the card number of the corresponding communication card to be transmitted to said processor means by said communication card recognition means.

5. The input device of claim 1 further comprising a computer interface for enabling the input device to communicate with an external computer.

* * * * *